US011455751B2

United States Patent
Lu et al.

(10) Patent No.: US 11,455,751 B2
(45) Date of Patent: Sep. 27, 2022

(54) ENCODING MULTI-DIMENSIONAL INFORMATION FOR DEEP VISION LEARNING

(71) Applicant: International Business Machines Corporation, Armonk, NY (US)

(72) Inventors: Shuyan Lu, Cary, NC (US); Eugene Irving Kelton, Wake Forest, NC (US); Yi-Hui Ma, Mechanicsburg, PA (US); John H. Walczyk, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 17/022,220

(22) Filed: Sep. 16, 2020

(65) Prior Publication Data
US 2022/0084034 A1 Mar. 17, 2022

(51) Int. Cl.
| G06T 11/00 | (2006.01) |
| G06Q 20/40 | (2012.01) |
| G06N 3/04 | (2006.01) |
| G06N 20/00 | (2019.01) |

(52) U.S. Cl.
CPC .............. *G06T 11/001* (2013.01); *G06N 3/04* (2013.01); *G06N 20/00* (2019.01); *G06Q 20/4016* (2013.01)

(58) Field of Classification Search
None
See application file for complete search history.

(56) References Cited

U.S. PATENT DOCUMENTS

| 6,876,981 | B1 | 4/2005 | Berckmans |
| 7,672,906 | B2 | 3/2010 | Schwartz et al. |
| 7,896,238 | B2 | 3/2011 | Fein et al. |
| 8,260,693 | B2 | 9/2012 | Griffin et al. |
| 8,294,719 | B1 | 10/2012 | Perttunen |
| 10,474,339 | B2 | 11/2019 | Dayan et al. |
| 2010/0070431 | A1 | 3/2010 | Kaylie |
| 2016/0189015 | A1 | 6/2016 | Coulier |
| 2018/0240187 | A1 | 8/2018 | Lee et al. |
| 2019/0073797 | A1* | 3/2019 | Chen .................... G06T 7/90 |
| 2019/0295383 | A1 | 9/2019 | Chen et al. |

(Continued)

OTHER PUBLICATIONS

Leite, Roger A., et al. "Eva: Visual analytics to identify fraudulent events." IEEE Transactions on Visualization and Computer Graphics (vol. 24, Issue: 1, Jan. 2018) (Year: 2018).*

(Continued)

*Primary Examiner* — Sarah Le
(74) *Attorney, Agent, or Firm* — Timothy J. Singleton (57) ABSTRACT

A method, system, and computer program product for computer vision modeling are provided. The method identifies a set of transactions. A set of categorical behavior transaction types are determined for the set of transactions. The set of categorical behavior transaction types are mapped to a set of colors in a color coordinate system. The method scales color component values of the set of colors in the color coordinate system to generate a pattern of colorized units at intervals along a timespan of the set of transactions. The method generates a fraud detection model based on the set of transactions and the color component values.

20 Claims, 6 Drawing Sheets

(56) References Cited

U.S. PATENT DOCUMENTS

2019/0342328 A1   11/2019   Rivner et al.
2019/0370812 A1   12/2019   Kandasamy et al.

OTHER PUBLICATIONS

Xie, Cong, et al. "Vaet: A visual analytics approach for e-transactions time-series." IEEE transactions on visualization and computer graphics 20.12 (2014): 1743-1752. (Year: 2014).*

Tremblay, Nicolas, Paulo Gonalves, and Pierre Borgnat. "Design of graph filters and filterbanks." Cooperative and Graph Signal Processing. Academic Press, 2018. 299-324 (Year: 2018).*

Sun et al., "FraudVis: Understanding Unsupervised Fraud Detection Algorithms", Institute of Interdisciplinary Information Sciences, Tsinghua University, 5 pages, printed Jul. 15, 2020.

Leite et al,. "Visual analytics for event detection: Focusing on fraud", Visual Informatics, 2018, https://doi.org/10.1016/i.visinf. 2018.11.001, 15 pages.

Gaikwad et al., "Credit Card Fraud Detection using Decision Tree Induction Algorithm", International Journal of Innovative Technology and Exploring Engineering (IJITEE), ISSN: 2278-3075, vol. 4, Issue 6, Nov. 2014, 4 pages.

Maeng et al., "Transaction authentication using complementary colors", Science Direct, Computer and Security, 48, 2015, 15 pages.

Kelton et al. "Classifying Behavior Through System-Generated Timelines and Deep Learning", U.S. Appl. No. 16/867,355, filed May 5, 2020.

Mell et al., "The NIST Definition of Cloud Computing", Recommendations of the National Institute of Standards and Technology, Special Publication 800-145, Sep. 2011, 7 pages.

* cited by examiner

ENCODING MULTI-DIMENSIONAL INFORMATION FOR DEEP VISION LEARNING

BACKGROUND

Investigating transaction sets often involves differing kinds of transactions and representations of transactions. The various representations of transactions present various types of transactions, transaction values, and transaction characteristics using numerical values, text, or combinations thereof. Systems often compel investigators to review transactions at varying levels of granularity to understand the transactions, parties to transactions, and patterns within sets of transactions.

SUMMARY

According to an embodiment described herein, a computer-implemented method for computer vision modeling is provided. The method identifies a set of transactions. A set of categorical behavior transaction types are determined for the set of transactions. The set of categorical behavior transaction types are mapped to a set of colors in a color coordinate system. The method scales color component values of the set of colors in the color coordinate system to generate a pattern of colorized units at intervals along a timespan of the set of transactions. The method generates a fraud detection model based on the set of transactions and the color component values.

According to an embodiment described herein, a system for computer vision modeling is provided. The system includes one or more processors and a computer-readable storage medium, coupled to the one or more processors, storing program instructions that, when executed by the one or more processors, cause the one or more processors to perform operations. The operations identify a set of transactions. A set of categorical behavior transaction types are determined for the set of transactions. The set of categorical behavior transaction types are mapped to a set of colors in a color coordinate system. The operations scale color component values of the set of colors in the color coordinate system to generate a pattern of colorized units at intervals along a timespan of the set of transactions. The operations generate a fraud detection model based on the set of transactions and the color component values.

According to an embodiment described herein, a computer program product for computer vision modeling is provided. The computer program product includes a computer-readable storage medium having program instructions embodied therewith, the program instructions being executable by one or more processors to cause the one or more processors to identify a set of transactions. A set of categorical behavior transaction types are determined for the set of transactions. The set of categorical behavior transaction types are mapped to a set of colors in a color coordinate system. The computer program product scales color component values of the set of colors in the color coordinate system to generate a pattern of colorized units at intervals along a timespan of the set of transactions. The computer program product generates a fraud detection model based on the set of transactions and the color component values.

DETAILED DESCRIPTION

The present disclosure relates generally to methods for computer vision modeling. More particularly, but not exclusively, embodiments of the present disclosure relate to a computer-implemented method for color encoding multi-dimensional transaction information for deep event vision learning and modeling. The present disclosure relates further to a related system for computer vision modeling, and a computer program product for operating such a system.

Investigating transaction sets often involves differing kinds of transactions and representations of transactions. In transaction investigations such as financial crimes, different kinds of representations attempt to present numerically based transactions to a reviewer. The reviewer is tasked with capturing and understanding context and patterns of the transactions while being presented with simply numerical and textual information.

As an example, transaction or financial fraud may take different forms, even within a single set or series of transactions. Transactions and events happen within a timespan and often systems rely on predictable occurrences. These systems may rely on traditional fraud detection logic to build fixed rules according to predetermined or particular circumstances, characteristics, or combinations thereof to recognize potential fraud and flag associated transactions or sets of transactions for further review.

Cognitive techniques may be employed in classification systems. Cognitive techniques may include deep learning systems using artificial intelligence such as machine learning and problem solving. These cognitive techniques may use neural networks such as feedforward neural networks. Feedforward neural networks use connections between units without forming a cycle. Information in such networks moves in a single direction from input nodes. Recurrent neural networks may also be used which establishes connections between units forming a directed cycle. These recurrent neural networks may establish an internal state allowing dynamic temporal behavior and using internal memory to process arbitrary sequences of inputs. Cognitive techniques may also employ convolutional neural networks using a feed-forward neural network composed of neurons with learnable weights and biases.

Some systems may use support vector machines (SVM). An SVM may construct a multidimensional mathematical space. The mathematical space may be based on training examples and provide boundaries in the mathematical space that allows for binary classification. Bayesian networks may also be used to represent a set of variables with a directed acyclic graph. The Bayesian network may then be used to compute probabilistic relationships between variables. Some cognitive systems may use two or more of the cognitive techniques discussed herein.

Embodiments of the present disclosure enable presentation of transactional information in color block presentations. The color block presentations enable direct, clear, and precise transmission of information regarding transmissions enabling better pattern recognition among investigators. Some embodiments of the present disclosure enable deep visual learning of computer learning models using color blocked visual presentations of transaction data. The color blocked transaction information may be used to generate computer learning models which provide quantified numerical measurements of the transactions. Embodiments of the present disclosure transforms sets of transactions or transaction series into multi-dimensional transaction signals. Color encoding is used to transform the transaction signals, happening at substantially similar times, into color blocks.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
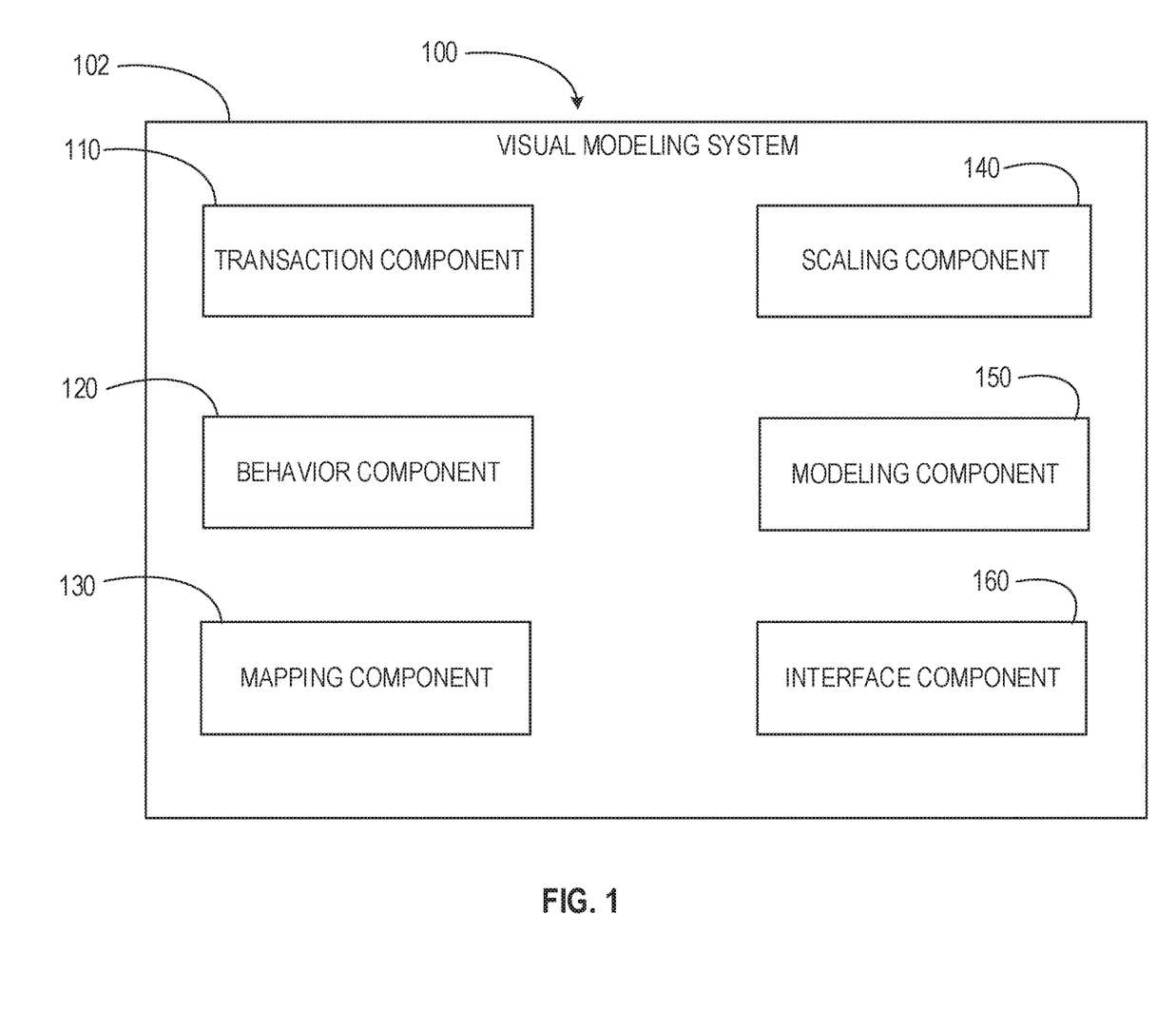
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a visual modeling system 102. The visual modeling system 102 may comprise a transaction component 110, a behavior component 120, a mapping component 130, a scaling component 140, a modeling component 150, and an interface component 160. The transaction component 110 identifies sets of transactions occurring within a timespan. The behavior component 120 determines a set of categorical behavior transaction types for the set of transactions. The mapping component 130 maps the set of categorical behavior transaction types for the set of transactions into a set of colors in a color coordinate system. The scaling component 140 scales the set of transactions into color component values of the set of colors in the color coordinate system. The modeling component 150 generates a fraud detection model based on the set of transactions and the color component values. The interface component 160 generates graphical representations of the set of transactions, the color component values, and results of the fraud detection model operating on the set of transactions. Although described with distinct components, it should be understood that, in at least some embodiments, components may be combined or divided, and/or additional components may be added without departing from the scope of the present disclosure.

Figure 2:
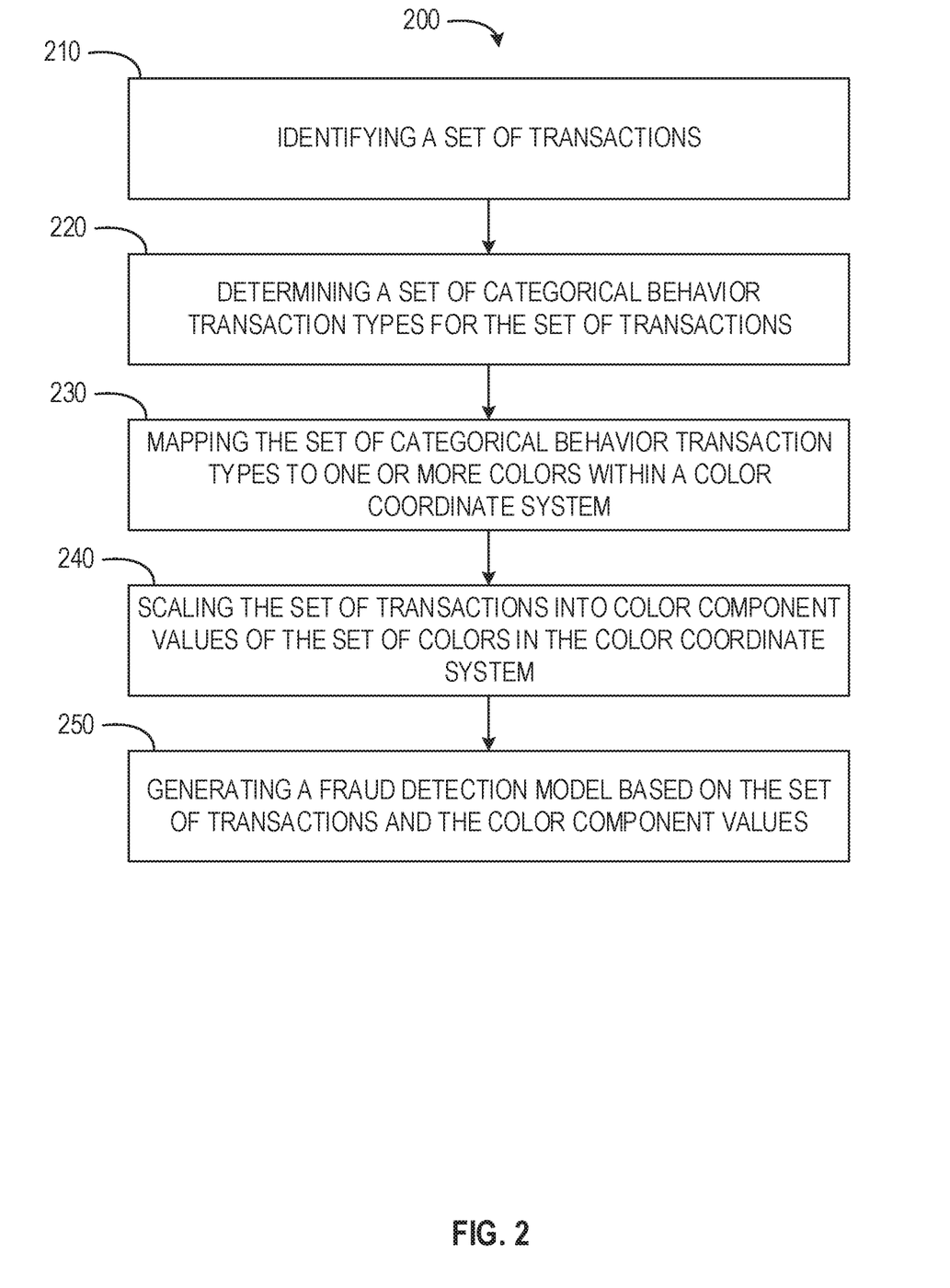
FIG. 2 depicts a flow diagram of a computer-implemented method for computer vision modeling, according to at least one embodiment.

Referring now to FIG. 2, a flow diagram of a computer-implemented method 200 is shown. The computer-implemented method 200 is a method for computer vision modeling. In some embodiments, the computer-implemented method 200 may be performed by one or more components of the computing environment 100, as described in more detail below.

At operation 210, the transaction component 110 identifies a set of transactions. The transaction component 110 may identify the set of transactions as the transactions occur within a timespan. In some embodiments, the transaction component 110 may identify and record the set of transactions within a transaction database. The transaction component 110 may identify and record the set of transactions using conventional means. The set of transactions may vary based on an application being used to create or record the transactions. In some embodiments, the set of transactions are financial transactions, such as customer transactions using a checking or savings account.

By identifying and recording the set of transactions, the transaction component 110 generates a transaction history for a given timespan. In some embodiments, the transaction history is generated for individual users, such that each user has a transaction history generated based on a set of transactions unique to that user. The given timespan may vary based on the user, the number of transactions, the type of transaction, or any other suitable metric. Each transaction may include transaction information such as a transaction value, a transaction date, and a transaction type.

The transaction component 110 may build a transaction history for a specific user or set of users by monitoring transactions for a specified user with an entity. The entity may be another user, an institution, or other suitable party to transactions. The transaction component 110 may build a transaction history for the specified user over a relevant period of time or timespan. The relevant period of time may vary based on transaction types of the user, the entity, or the set of transactions.

At operation 220, the behavior component 120 determines a set of categorical behavior transaction types for the set of transactions. Each transaction may be associated with a transaction type. For example, financial transactions may be characterized by transaction types including deposits, withdrawals, in-bank transfers, and automated clearing house transfers. Each transaction type may represent a transaction and include transaction characteristics defining the transaction type.

In the above example, transaction characteristics may include a transaction source, a transaction recipient, a transaction method, a transactional balance, a transaction value, a transaction date, and a transaction frequency. The transaction source may represent a party initiating a transaction. The transaction recipient may represent a party receiving a transaction request from the transaction source. The transaction method may represent one or more of a machine, resource, or network on which the transaction was or is to be carried out. The transactional balance may represent one or more of a starting balance and an ending balance associated with a given transaction. The transaction frequency may indicate a repeated transaction, a repetition rate for the repeated transaction, and a repetition timing of the repeated transaction. The repetition rate may indicate how often a repeated transaction occurs. For example, the repetition rate may indicate a number of days between repetitions of the repeated transaction. The repetition timing may indicate a time of day, time of month, or other relative time metric for the repeated transaction.

The set of categorical behavior transaction types may include malicious, suspicious, and normal. In some embodiments, malicious behavior may include labels such as "Identity Theft," "Money Laundering," "Fraud," "Shell Company," "Check Kiting," or "Forgery." Although described with examples of specific categorical behaviors, it should be understood that any suitable labels may be generated and applied for any behavior type or entity classification that may be determined or modeled from transaction records.

The transaction component 110 and the behavior component 120 may act alone or cooperatively to separate or split the set of transactions to categorize the transactions. In some embodiments, the set of transactions are separated based on transaction type. In some instances, the set of transactions are separated based on categorical behavior transaction type. Splitting the set of transactions may be performed as part of one or more of operations 210 and 220.

In some embodiments, the set of transactions are used to split the set of transactions into multiple transaction signals based on each transaction's corresponding transaction type. For example, the set of transactions may be separated or split into three signals of a wire transfer signal, a cash deposit signal, and a daily assumption signal.

In some embodiments, the transaction component 110 partitions the set of transactions into a set of signals. The set of transactions may act as a transaction series. The set of transactions may be partitioned based on the set of categorical behavior transaction types. In some instances, the set of transactions are partitioned into the set of signals with a Fourier Transform. The transaction component 110 may separate or split the transaction series or set of transactions into multiple signals with Fourier Transform based on a frequency of the transactions. In some embodiments, the transaction component 110 separates the set of transactions into frequencies indicating the behavior types associated with each transaction or each frequency.

At operation 230, the mapping component 130 maps the set of categorical behavior transaction types for the set of transactions. The mapping component 130 may map the set of categorical behavior transaction types to one or more colors within a color coordinate system. Mapping the set of categorical behavior transaction types to the one or more colors may enable a single color to represent one or more transaction behaviors. In some embodiments, mapping the set of categorical behavior transaction types to the one or more colors enables a color to represent a transaction behavior which occurred at a single point in time or across a period of time.

At operation 240, the scaling component 140 scales the set of transactions into color component values of the set of colors in the color coordinate system. The set of colors may be distributed across the color coordinate system. The scaling component 140 may scale transaction series into a predetermined format for color encoding. In some instances, the scaling component 140 scales subsets of transactions, transaction signals, or transaction frequencies into the predetermined format for color encoding.

For example, the scaling component 140 may scale values of transaction signals or transaction frequencies into specified number ranges. In some embodiments, the scaling component 140 scales values associated with the transaction signals or transaction frequencies into numerical values within an RGB color scale. In such instances, the scaling component 140 may scale the transaction signals or transaction frequencies into red, green, and blue color values between zero and two-hundred fifty-five, such that each transaction, each transaction signal, or each transaction frequency includes a red value, a green value, and a blue value within the RGB color scale. Thus, the scaling component 140 scales value for the transactions to fit transaction signals into specified color ranges.

In some instances, scaling the color component values and mapping the set of transactions to the one or more colors generates a pattern of colorized units. The set of transactions may be mapped to the colors within the color coordinate system based on the categorical behavior transaction types of the set of transactions, based on timing of transactions, and based on the transaction signals or transaction frequencies into which the transactions are split. In some instances, the mapping component 130 maps the set of categorical behavior transaction types to the set of colors by encoding scaled signals to a color value or a set of color values. In some instances, the set of transactions are mapped to the colors within the color coordinate system based on a time or time interval at which the transaction occurred. In such instances, the pattern of colorized units may be generated at intervals along a timespan of the set of transactions.

The pattern of colorized units may be represented as an image, chart, graph, or pictorial diagram. The pattern of colorized units are presented within the image or other visual depiction within the specified color ranges into which the transactions are scaled and mapped. In some instances, the pattern of colorized units are represented along a transaction timeline within the transaction history. Each transaction of the pattern of colorized units may be represented by a bar having a height that is proportional to a value associated with the transaction. As described herein, differing transaction types may be assigned differing colors. In a financial transaction example, a deposit may be represented in a first color, such as green. A withdrawal may be represented in a second color, such as red. Transactions using a card may be represented by a third color, such as pink. Point-of-sale transactions may be represented by a fourth color, such as blue. In some embodiments, the pattern of colorized units are presented in a bar chart, such that the transactions are presented as differing colored bars and relative values of the transactions are presented as relative heights of the bars.

At operation 250, the modeling component 150 generates a fraud detection model based on the set of transactions and the color component values. The fraud detection model may be configured to detect potential fraud, suspicious activity, or malfeasance in a set of transactions based on computer vision techniques using the color mapping and color scaling of transactions. In some embodiments, the fraud detection model is generated using deep vision learning.

In some embodiments, the modeling component 150 generates the fraud detection model using cognitive techniques. The cognitive techniques may include deep learning, deep visual learning, neural networks, recurrent neural networks, feedforward neural networks, convolutional neural networks, support vector machines, combinations thereof, and any other suitable machine learning methods or techniques. The modeling component 150 may generate the fraud detection model by feeding or passing a plurality of sets of transactions or transaction series through one or more of the cognitive techniques. In some embodiments, the plurality of sets of transactions or transactions series are test transactions. The test transactions may be labeled with categorical transaction behavior types, transaction types, and transaction characteristics. In some embodiments, the test transactions have been mapped and scaled to generate patterns of colorized units. In some embodiments, the test transactions are a result of operations 210-240. The modeling component 150 may also pass graphical images of mapped and scaled patterns of colorized units to the cognitive techniques, where the graphical images are associated with specified categorical transaction behavior types and transaction types. The cognitive techniques may match behavior patterns, categorical transaction behavior types, and transaction types of the test transactions and the graphical images to define the fraud detection model.

In some embodiments, to prepare the mapped and scaled set of transactions and pattern of colorized units for use in generating the fraud detection model or evaluating the set of transactions for fraud using a preestablished fraud detection model, the set of transactions and pattern of colorized units may be converted from an image into a bitmap. A resolution of the bitmap may be based on a granularity of the timespan of the set of transactions, a number of transactions, or combinations thereof. For example, the resolution of the bitmap may be such that a pixel size within the bitmap is less than a smallest increment of time used in the timespan for the set of transactions. The bitmap may then be flattened to break down a grid of the bitmap into a series of rows and columns. The rows and columns may then be concatenated to form a one-dimensional array. For example, a bitmap having a grid of n by m pixels may be converted into an array of (n×m) in length. In this example, a first element of the array may be pixel (1,1) and a final element in the array may be pixel (n,m). Each element may be assigned a color value representing a color value of that pixel within the bitmap. In some embodiments, the color value of pixels associated with transactions depicted in the pattern of colorized units corresponds to one or more of the transaction type and the categorical behavior transaction type.

The fraud detection model may generate a graphical user interface to present visual information depicting the set of transactions for visual inspection. Once a set of transactions have been passed through the fraud detection model, the fraud detection model may match historical timeline images for respective historical transaction timelines and associated labels to the set of transactions. The fraud detection model may identify instances of fraud and types of fraud occurring within the set of transactions. In some embodiments, the graphical user interface generates an output of the fraud detection model along with at least a portion of the set of transactions, the transaction timespan, and the patterns of colorized units. The graphical user interface may present the set of transactions, the transaction timespan, the patterns of colorized units, and indications of identified fraud detected within the set of transactions. The graphical representations within the graphical user interface may be color coded according to transaction types, timespan, and identified fraud types. For example, the graphical representations may include statistical values, median transaction values, malicious behavior types, and actions performed responding to the malicious behavior types. The actions performed may include notification of the malicious behavior, denial of a transaction or subset of transactions associated with the malicious behavior, or challenges to the transactions or subsets of transactions associated with the malicious behavior.

Figure 3:
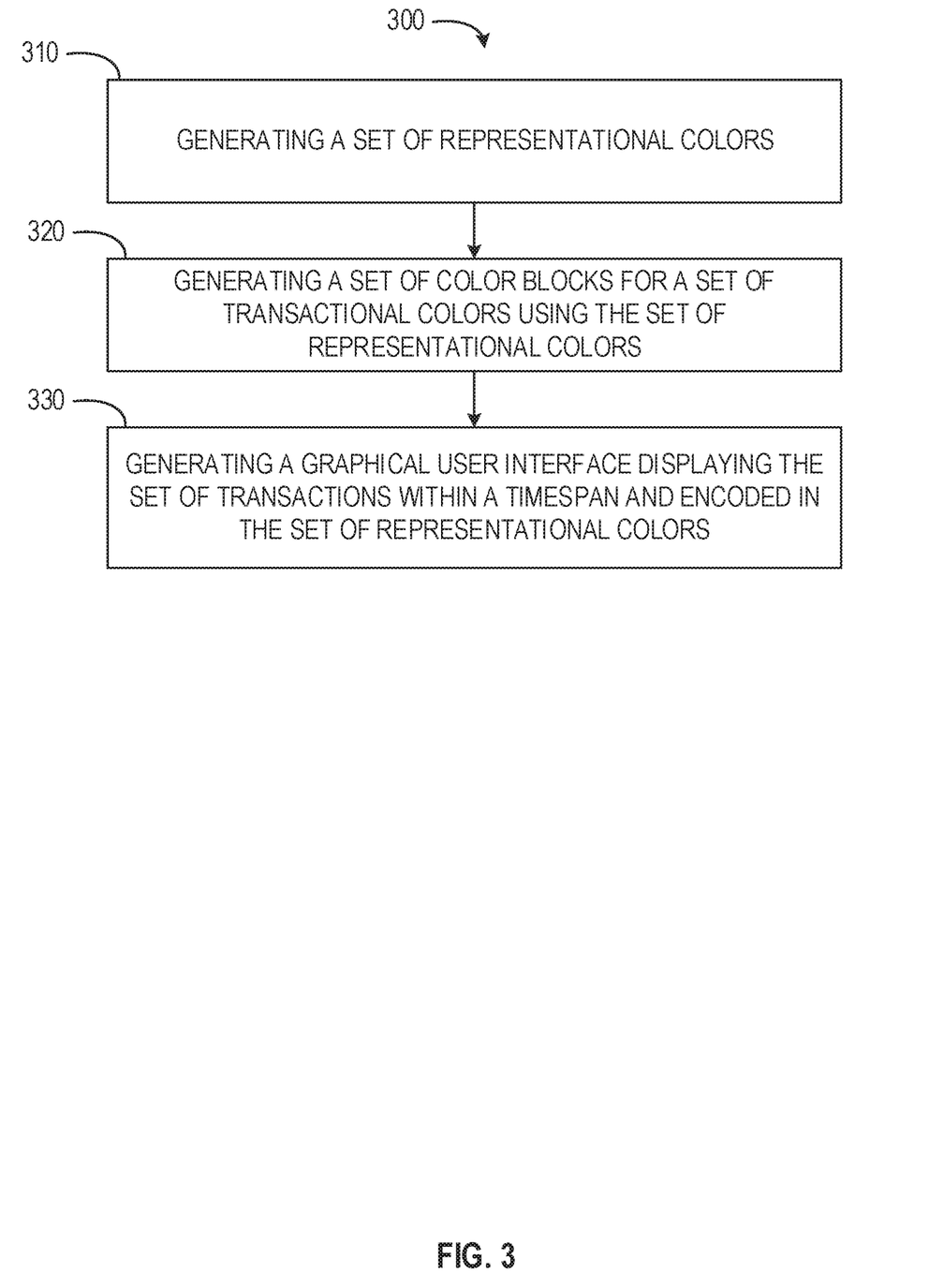
FIG. 3 depicts a flow diagram of a computer-implemented method for computer vision modeling, according to at least one embodiment.

FIG. 3 shows a flow diagram of an embodiment of a computer-implemented method 300 for computer vision modeling. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the scaling component 140 generates a set of representational colors. The scaling component 140 may generate the set of representational colors by encoding scaled color component values to represent the set of categorical behavior transaction types. The scaling component 140 may encode the scaled color component values to the set of categorical behavior transaction types based on a timespan of a set of transactions. Variations in the set of representational colors may indicate one or more of a time at which a specified transaction took place relative to a current time, a type of transaction (e.g., a withdrawal, a transfer, a purchase, or a deposit), and whether the transaction is fraudulent or suspicious based on categorical behavior transaction types.

In operation 320, the interface component 160 generates a set of color blocks for a set of transactions. The set of color blocks may represent one or more transaction changes to the set of transactions during the timespan of the set of transactions. The color blocks may represent individual transactions as a block of a specified uniform color within a bar chart. In some embodiments, the color blocks represent groups of transactions. The groups of transactions may share common transaction characteristics. For example, the groups of transactions may occur at a similar time, include a same transaction type (e.g., a withdrawal, a transfer, a purchase, or a deposit), include a same transaction recipient, include a same value, combinations thereof, or any other common transaction characteristic. A color block may also group transactions deemed to be suspicious or fraudulent, based on the categorical behavior transaction type, the transaction type, the time at which the transaction occurred, combinations thereof, or any other suitable indicators of suspicious activity.

In operation 330, the interface component 160 generates a graphical user interface. The graphical user interface may display the set of transactions within the timespan of the set of transactions encoded with the set of representational colors. The graphical user interface may present the set of color blocks, transaction information, transaction characteristics, transaction metadata, combinations thereof, or any other suitable transaction information in a visual format. In some embodiments, the interface component 160 generates the graphical user interface in a manner similar to or the same as described above with respect to operation 250.

Figure 4:
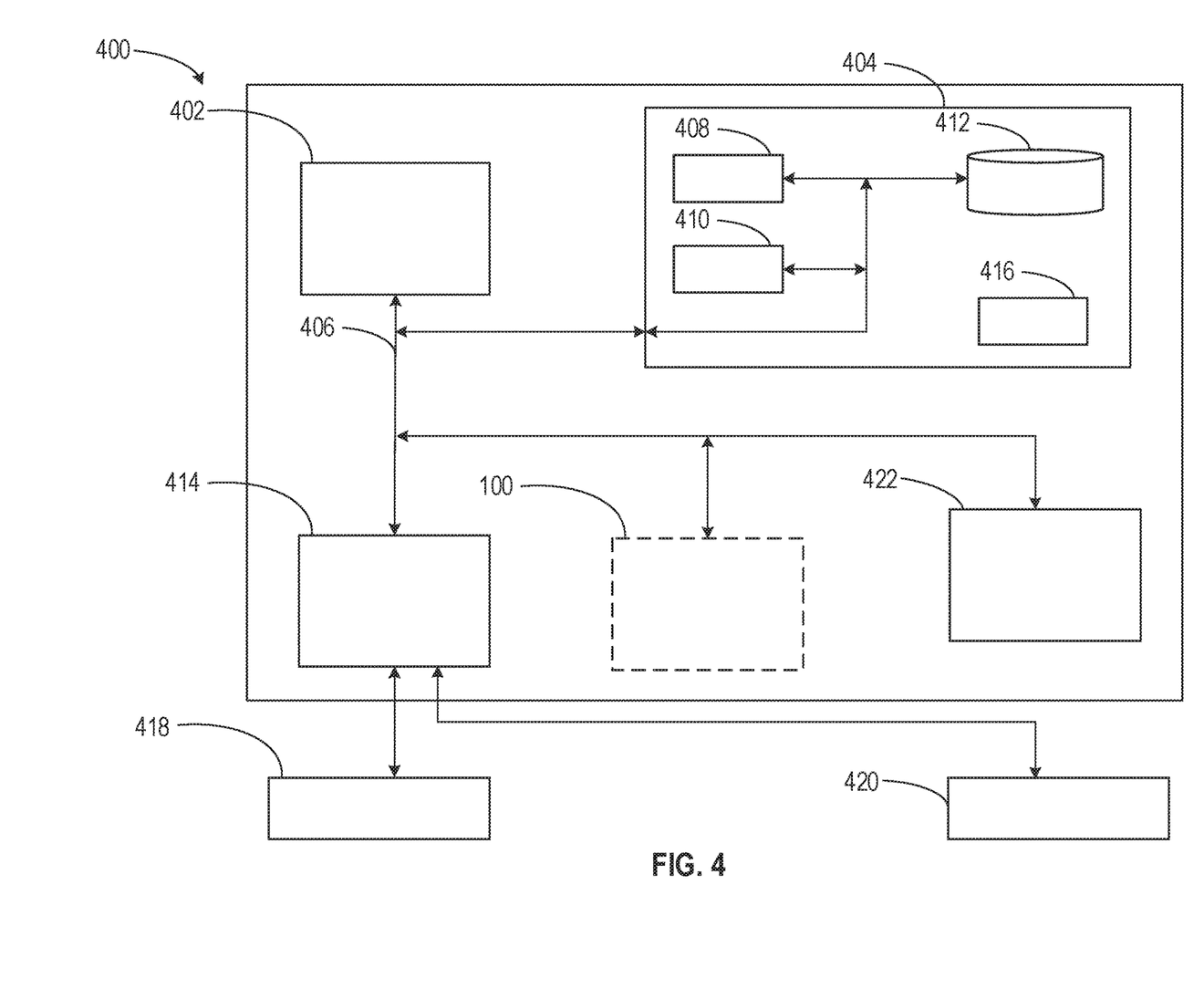
FIG. 4 depicts a block diagram of a computing system for computer vision modeling, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for computer vision modeling.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the transaction component 110, the behavior component 120, the mapping component 130, the scaling component 140, and the modeling component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
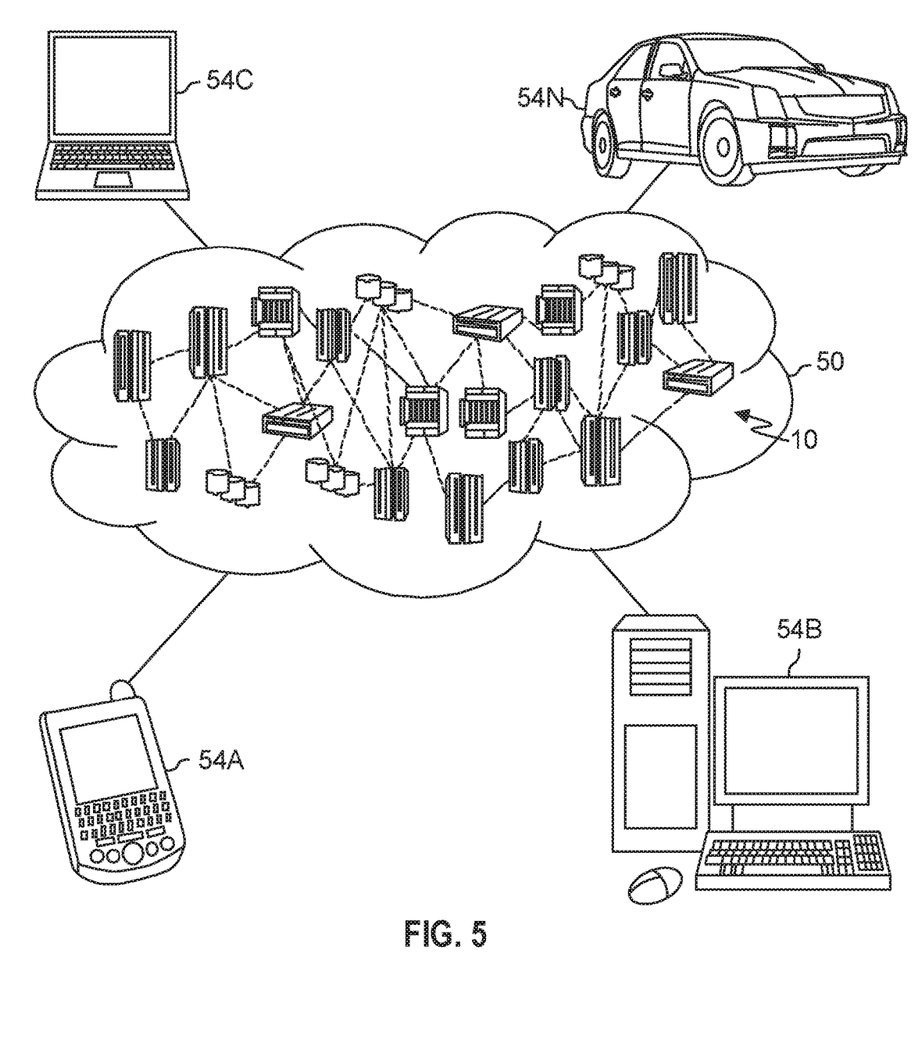
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
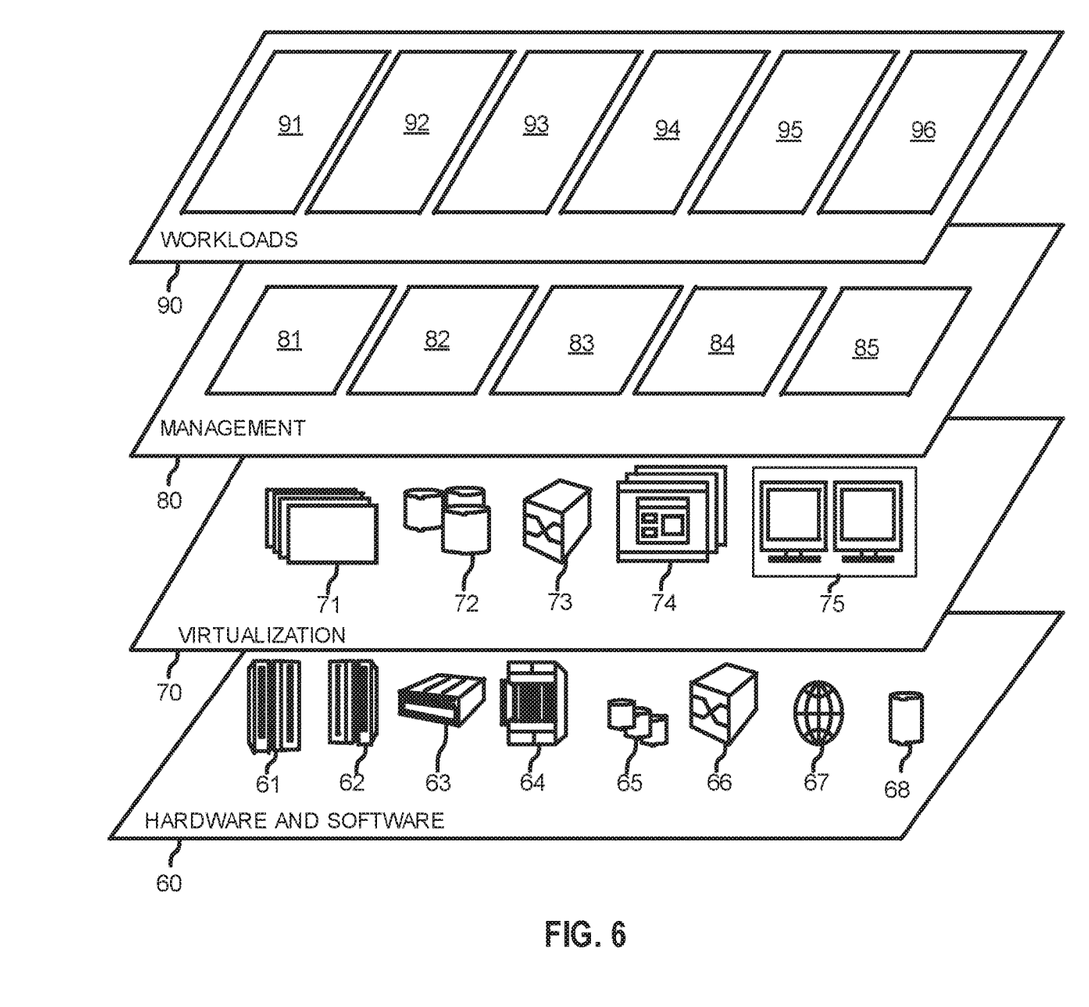
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual modeling processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a set of transactions;
   determining a set of categorical behavior transaction types for the set of transactions;
   mapping the set of categorical behavior transaction types to a set of colors in a color coordinate system, each color of the set of colors in the color coordinate system having a set of color component values to form the color;
   scaling the set of transactions into color component values of the set of colors in the color coordinate system to generate a pattern of colorized units at intervals along a timespan of the set of transactions, the set of transactions being scaled by modifying one or more values associated with each transaction to fit at least one color component value of the set of color component values associated with a color mapped to a categorical behavior transaction type; and
   generating a fraud detection model based on the set of transactions and the color component values.

2. The method of claim 1, further comprising:
   partitioning the set of transactions into a set of signals based on the set of categorical behavior transaction types.

3. The method of claim 2, wherein the set of transactions are partitioned into the set of signals with Fourier Transform.

4. The method of claim 1, wherein scaling the set of transactions into the color component values further comprises:
   generating a set of representational colors by encoding color component values to represent the set of categorical behavior transaction types based on the timespan of the set of transactions.

5. The method of claim 4, further comprising:
   generating a graphical user interface displaying the set of transactions within the timespan of the set of transactions encoded with the set of representational colors.

6. The method of claim 5, wherein generating the graphical user interface further comprises:
   generating a set of color blocks for the set of transactions, the set of color blocks representing one or more transaction changes to the set of transactions during the timespan.

7. The method of claim 1, further comprising:
   generating a bitmap of the set of transactions by flattening an image representing the pattern of colorized units.

8. A system, comprising:
   one or more processors; and
   a non-transitory computer-readable storage medium, coupled to the one or more processors, storing program instructions that, when executed by the one or more processors, cause the one or more processors to perform operations comprising:
   identifying a set of transactions;
   determining a set of categorical behavior transaction types for the set of transactions;
   mapping the set of categorical behavior transaction types to a set of colors in a color coordinate system, each color of the set of colors in the color coordinate system having a set of color component values to form the color;
   scaling the set of transactions into color component values of the set of colors in the color coordinate system to generate a pattern of colorized units at intervals along a timespan of the set of transactions, the set of transactions being scaled by modifying one or more values associated with each transaction to fit at least one color component value of the set of color component values associated with a color mapped to a categorical behavior transaction type; and
   generating a fraud detection model based on the set of transactions and the color component values.

9. The system of claim 8, wherein the operations further comprise:
   partitioning the set of transactions into a set of signals based on the set of categorical behavior transaction types.

10. The system of claim 9, wherein the set of transactions are partitioned into the set of signals with Fourier Transform.

11. The system of claim 8, wherein scaling the set of transactions into the color component values further comprises:

generating a set of representational colors by encoding color component values to represent the set of categorical behavior transaction types based on the timespan of the set of transactions.

12. The system of claim 11, wherein the operations further comprise:
generating a graphical user interface displaying the set of transactions within the timespan of the set of transactions encoded with the set of representational colors.

13. The system of claim 12, wherein generating the graphical user interface further comprises:
generating a set of color blocks for the set of transactions, the set of color blocks representing one or more transaction changes to the set of transactions during the timespan.

14. The system of claim 8, wherein the operations further comprise:
generating a bitmap of the set of transactions by flattening an image representing the pattern of colorized units.

15. A computer program product comprising a non-transitory computer readable storage medium having program instructions embodied therewith, the program instructions being executable by one or more processors to cause the one or more processors to perform operations comprising:
identifying a set of transactions;
determining a set of categorical behavior transaction types for the set of transactions;
mapping the set of categorical behavior transaction types to a set of colors in a color coordinate system, each color of the set of colors in the color coordinate system having a set of color component values to form the color;
scaling the set of transactions into color component values of the set of colors in the color coordinate system to generate a pattern of colorized units at intervals along a timespan of the set of transactions, the set of transactions being scaled by modifying one or more values associated with each transaction to fit at least one color component value of the set of color component values associated with a color mapped to a categorical behavior transaction types; and
generating a fraud detection model based on the set of transactions and the color component values.

16. The computer program product of claim 15, wherein the operations further comprise:
partitioning the set of transactions into a set of signals based on the set of categorical behavior transaction types.

17. The computer program product of claim 16, wherein the set of transactions are partitioned into the set of signals with Fourier Transform.

18. The computer program product of claim 15, wherein the set of transactions into scaling the color component values further comprises:
generating a set of representational colors by encoding color component values to represent the set of categorical behavior transaction types based on the timespan of the set of transactions.

19. The computer program product of claim 18, wherein the operations further comprise:
generating a graphical user interface displaying the set of transactions within the timespan of the set of transactions encoded with the set of representational colors.

20. The computer program product of claim 19, wherein generating the graphical user interface further comprises:
generating a set of color blocks for the set of transactions, the set of color blocks representing one or more transaction changes to the set of transactions during the timespan.

* * * * *